United States Patent Office 3,401,914
Patented Sept. 17, 1968

3,401,914
FLUID CONTROLLING VALVES
Stanley Grapes Shand, Hereford, England, assignor to Saunders Valve Company Limited, Monmouthshire, England, a British company
Filed Feb. 23, 1965, Ser. No. 434,350
Claims priority, application Great Britain, Feb. 25, 1964, 7,841/64
16 Claims. (Cl. 251—172)

ABSTRACT OF THE DISCLOSURE

In a valve having seating rings cooperating with an obturating member such as a ball plug or gate, the seating rings (suitably of PTFE) are sealed each to a flexible metallic diaphragm (suitably of stainless steel) by an O-ring (suitably of "Viton") and the margin of the diaphragm is sealed to the valve casing by a similar O-ring. The former O-ring is disposed so that the seating ring and diaphragm protect it from the controlled medium. The seating ring is pressed against the obturating ring by the spring action of the diaphragm and the controlled fluid which has access to the back of the diaphragm.

---

Figures 1, 2, 3, 4:
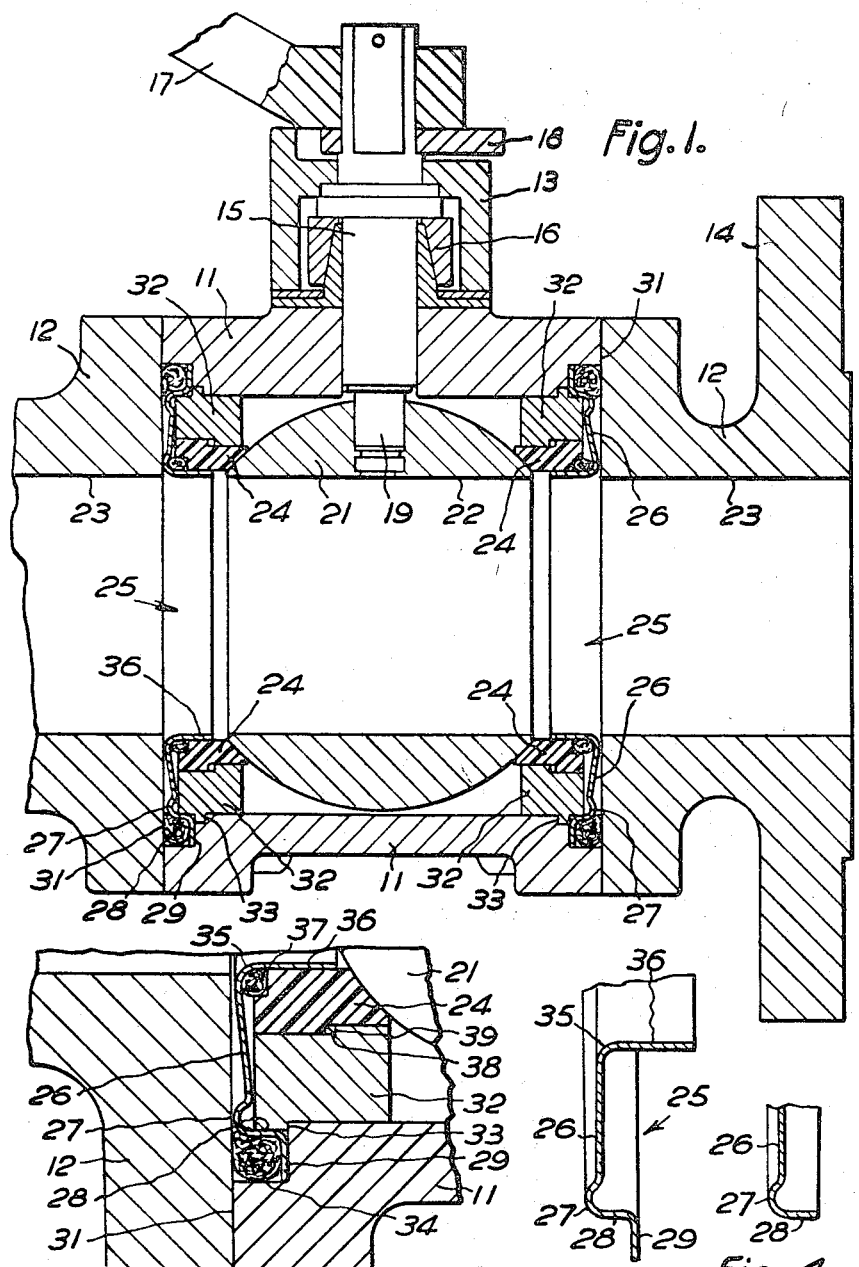

This invention relates to valves for the control of fluids, having annular seating rings cooperating with an obturating member, such as gate valves, and plug cocks having spherical plugs often referred to as ball plug valves.

It is known to press the annular seating rings with which such valves are provided against the obturating member, i.e., gate or ball, under spring pressure and seal them to the valve casing by a flexible diaphragm, the pressure of the medium controlled by the valve having access to the back of the movable ring structure over sufficient area to increase the sealing pressure as the pressure of the medium rises. Examples in which the seating rings are sealed to the casing by a separate diaphragm made of an elastomer are to be found in Patents Nos. 2,520,288 and 2,751,185 (ball valves) and 2,853,269 (gate valve) and in which the seating rings are sealed to the casing by a diaphragm integral with seating rings of moulded elastomer in British patent specifications Nos. 692,085 and 843,149 (ball valves) and U.S. Patent No. 2,732,170 (gate valve), and many of these constructions have been commercially produced on a substantial scale. We have also commercially produced many years ago ball plug valves (for the control of hot air) in which rigid (aluminium bronze) seating rings have seating surfaces to match the ball plug were sealed each to the inner margin of a thin metal (stainless steel) diaphragm by means of a metal clamping ring fitted behind the diaphragm over a shoulder on the seating ring and held by plastic deformation of a lip on the seating ring, and sealed at the outer margin between the main casing or body of the valve and bolted-on end fittings forming pipe connections; in the absence of line pressure the seating rings were pressed against the ball plug by thin dished metal (Phosphor bronze) springs. The seating rings and clamping rings were an easy sliding fit in bores in the main casing and end fittings respectively, and a surface in each end fitting formed a stop to limit the movement of the ring towards the end fitting and thus the deflection of the diaphragm and of the spring in this direction.

In most of the above mentioned ball plug valves, the ball plug was loosely coupled by a slot to a key formed on the valve spindle and the ball plug had freedom for limited floating movement in the main casing. In the case of gate valves also there was corresponding freedom for limited float normal to the gate.

The present invention makes use of at least one seating ring sealed to the casing by an annular diaphragm of metal thin enough to be flexible, which is sealed at its inner margin to the seating ring and at its outer margin to the valve casing, so that the obturating member is afforded limited float, but the diaphragm and the valve casing being of such section that when the valve is assembled the diaphragm is elastically deflected sufficiently to exert spring pressure of the ring against the obturating member while leaving a gap between the back of the diaphragm and the valve casing so that the controlled medium has access to the back of the diaphragm. But while such a combination not only provides for the diaphragm to act also as a spring but readily accommodates relative changes in dimensions with changes in temperature, the sealing of the diaphragm to the seating ring on one hand and the casing on the other presents certain difficulties, especially where the seating ring is of a material which cannot be directly bonded to metal, for example polytetrafluoroethylene (PTFE) which is a highly desirable material for the seating ring on account of its low coefficient of friction, its high chemical resistance and the high range of temperature over which it maintains its mechanical and chemical properties. The present invention makes the seal between the seating ring and diaphragm by an O-ring and the seal between the diaphragm and casing by an O-ring.

To make the seal between the diaphragm and seating ring, the diaphragm at its inner margin may terminate through a well-rounded junction in a tubular part which fits within and so carries the seating ring, and the O-ring is lodged between the rounded junction and the seating ring, so that it is protected from the controlled medium. The cross-section of the diaphragm and seating ring in this region are such that the O-ring is substantially wholly enclosed. Thus the rounded junction could take the form of a bead which in conjunction with back of the seating ring provided the necessary enclosure, or there might be a shallower bead and a shallow recess in the back of the seating ring, but it is preferred to provide a sufficient recess in the back of the ring, so avoiding any bead in the diaphragm.

Desirably a guiding surface is provided in the valve casing in which the seating ring is a sliding fit. Then with the above described arrangement of the seal between the seating ring and the inner margin of the diaphragm in which the diaphragm covers the inner diameter and the back of the ring, the diaphragm, obturating member and the guiding surface which will in general all be of metal, will between them substantially fully surround and enclose the seating ring, so enabling it to be used with high pressures even if of a material which becomes slightly plastic under operating conditions. Under the same conditions extrusion of the material of the ring when relative movement is taking place, i.e., when the ring is not pressing all round against the obturating member as it does in the fully open and fully closed positions, may be prevented by shouldering the guiding surface and the guided surface of the sealing ring to limit the movement of the seating ring towards the obturating member, the shoulders being so located that when the seating ring is pressing all round against the obturating member the shoulders are not quite in contact and thus do not prevent the ring from pressing under spring and fluid pressure. There may also be a surface in the casing located and shaped to take part of the fluid pressure acting on the diaphragm thus enabling a radially wider diaphragm to be used than would otherwise be feasible. The guiding surface and pressure-taking surface could be integral with the casing but usually the relative dimensions of the parts make it desirable to leave a radial space between the seating ring and the valve casing and to form these surfaces on a metal ring which fills the radial space.

Preferably the diaphragm is of uniform thickness but has a corrugation near its outer margin to form a bead facing away from the obturating member, by the aid of which initial deflection is applied when the valve is assembled, while leaving clearance for the controlled medium to have access to the back of the diaphragm up to the bead. The greater part of the diaphragm may be flat when it is free, the initial deflection bringing this part to a shallow conical form, but cases may arise in which it is more convenient to give this part a shallow conical form when free, the initial deflection increasing or decreasing the conicity.

To make the seal between the diaphragm and casing, at the outer margin the diaphragm may have a part which is tubular and directed towards the obturating member, this tubular part lodging in a recess in the casing of the valve externally surrounding this tubular part, the O-ring being located in the recess and thus substantially totally enclosed. To permit assembly, the recess is closed by an end fitting which is secured to the casing. With this arrangement of the seal, it may be necessary for the cross-section of the O-ring to be modified from the standard circular form, but if the tubular part of the diaphragm continues into an outward transverse part which is also accommodated in the recess, the tubular part and transverse part will lap about half way round the cross-section of the O-ring and this enables a standard form of O-ring of circular cross-section to be used. In either arrangement the O-ring is protected from the medium flowing through the valve and is located away from the parts swept by the controlled medium so that it is outside the hot zone where a hot medium is being controlled.

The invention will be further described with reference to the accompanying drawings in which:

FIGURE 1 is a longitudinal section of a ball plug valve according to the invention, FIGURE 2 is a detail of FIGURE 1 on a larger scale, FIGURE 3 is a detail section showing the same parts of the diaphragm as FIGURE 2 but before it is clamped in the valve, and FIGURE 4 is a detail showing an alternative form of part of the diaphragm.

The valve illustrated in FIGURE 1 comprises a casing or body 11 to which are bolted two end fittings 12 and a bonnet 13. The fittings 12 serve for the connection of the valve in a pipe line and solely by way or example one of them is shown with a flange 14 for this purpose. It will be understood that the end fittings may be arranged for any other type of connection such as a screwed or welded connection. The bonnet 13 serves to journal and seal to the casing 11 a spindle 15. The seal indicated generally at 18 can be of any desired kind suitable for the service in view and is not in itself a part of the present invention.

One end of the spindle projects to enable it to be turned to operate the valve, by way of example by a handle 17 and the angle of rotation may be limited by known means exemplified by a noncircular disc 18 cooperating with stops not shown on the bonnet.

The lower end of the spindle projects into the space within the casing 11 and is shaped to form a key 19 which is an easy fit in a slot in the ball plug 21 which has a through bore 22 to match the bore 23 of the fittings 12. The manner in which the ball plug serves to form an obturating member which moves between open and closed position by rotation through 90° by means of the spindle is well known and needs no further description.

For the valve to be tight in both open and closed positions against leakage of the controlled medium, the ball must make a good sliding joint with the casing. In the valve according to the invention this joint is made with two seating rings 24 which are themselves sealed to the casing and the external diameter of which substantially matches the bores 22, 23.

As the two rings 24 and their sealing to the casing are identical it suffices to describe one of them in detail. The surface of the ring 24 which actually contacts the ball is narrow but spherical to the same radius as the ball so that narrow surface contact is obtained. To allow for wear and inaccuracies some float of the ball plug (as permitted by the key and slot connection to the spindle 15) and the application of pressure of seating ring 24 against the ball plug made up both of spring pressure and a pressure depending on the pressure of the controlled medium, the ring 24 is sealed to a thin metal diaphragm 25 which supplies the spring pressure and to the back of which the controlled medium has access. As can be seen from FIGURE 3, the diaphragm is of uniform thickness and when it is free a wide annular portion 26 of it is flat, but at the outer periphery of this flat portion it has a corrugation 27 forming a convex bead facing away from the ball plug 21. From the corrugation there is a short tubular portion 28 towards the ball plug 21 which runs with a rounded junction into a transverse annulus 29. The parts 28, 29 of the section lodge in a recess in the casing 11 while the adjacent surface 31 of the fitting 12 is flat and the parts are so proportioned that with the seating ring 24 against the ball plug 21 when the fitting 12 is bolted to the casing its surface 31 engages the bead 27 and the flat portion 26 is elastically deflected into a shallow cone so that the diaphragm acts as a spring pressing the ring 24 against the ball plug. The deflection produced in this way may be just sufficient or a little less than sufficient to bring the junction of the bead 27 and flat portion 26 against the back of a metal ring fitting in the casing 11 and checked against inward movement by shoulders abutting at 33. Except at the contact of the surface 31 with the bead 27 there is clearance between the back of the diaphragm and the surface 31 so that the controlled medium has access to the back of the diaphragm to supplement the spring pressure. Since part of the diaphragm is in contact with the ring 32 or is brought into such contact after very slight deflection by the fluid pressure, part of the fluid pressure is transmitted to the ring 32 and not to the seating ring 24. In this way by choosing the proportions of the parts, the portion 26 of the diaphragm can be made of such width as to give a suitable spring action and the effective fluid pressure urging the seating ring against the ball plug be kept to a suitable value.

It will be seen that the above described shaping of the parts 28, 29, the recess in the casing 11 and the surface 31 form a closed space round the periphery of the diaphragm on the side away from the ball plug, and an O-ring 34 is held in this space which is of such proportions that it seals the outer periphery of the diaphragm to the casing 11. Further the O-ring 34 is out of contact with the medium flowing through the valve and is located away from the flow passage, i.e., away from the hot zone if the medium is at high temperature.

At its inner periphery, the flat portion 26 runs with a well rounded junction 35 into a tubular portion 36 which fits within and forms a support for the seating ring 24 but the seal between diaphragm and the ring 24 is made by an O-ring 37 which is lodged in a recess in the back of the ring 24 in the rounded junction 35. This O-ring 37 also is protected from the flowing medium.

The metal ring 32, as well as taking part of the fluid pressure acting on the back of the diaphragm, is of such dimensions radially that it is in sliding contact with the outside of the seating ring 24 so that it serves to support and protect the latter. When the valve is fully open or fully closed, the seating ring bears all round against the ball plug and it is completely enclosed over its whole cross-section, thus protecting it and enabling material which may become somewhat pastic under operating conditions to be used. Between fully open and fully closed positions or if the parts should be assembled without the ball plug in position, inward movement of the ring 24 is checked by the abutment of shoulders 38, 39 on the rings 24 and 32 respectively but under normal operating conditions when the valve is fully open or closed there is a little clearance between these shoulders 38, 39 and they thus do not prevent the application of the ring 24 against the ball plug 21 under the spring and fluid pressure. In the case of a ring 24 of a material which may be somewhat plastic under operating conditions, the abutment of the shoulders 38, 39 during opening or closing of the valve serves to hinder extrusion of the material of the ring into the bore of the ball plug.

For many purposes a very suitable material for the seating rings 24 is PTFE which as above mentioned has a low coefficient of friction thus making for low operating torque, is highly resistive chemically and preserves its chemical and mechanical properties over a wide range of temperatures, but it cannot be directly or adhesively bonded to other materials and at high temperatures it becomes somewhat plastic, but it will be clear from the preceding description that the present invention makes provision for both these difficulties. If higher temperatures are to be provided for than PTFE can withstand even in a valve constructed according to the invention, and the medium to be controlled is not chemically aggressive, the seating rings may be of metal.

For most purposes the diaphragm may be of spring-hard stainless steel, or if the temperature is higher than desirable for stainless steel, of nickel bronze.

The O-rings need to be more resilient and flexible than such a material as PTFE if they are to make a good seal, and the required qualities are not easily obtained together with high chemical and temperature resistance. As however the invention enables them to be protected from the controlled medium, and as regards the outer O-ring also from the highest temperature, the selection of the material is eased. Both at the inner and outer margins of the diaphragm the O-rings may be of silicone rubber, or of the plastics material based on a linear copolymer of vinylidene fluoride and hexafluoropropylene as sold under the trademark "Viton."

The present invention is applicable to both gate valves and plug cocks, but it is especially applicable to ball plug valves.

What I claim is:

1. A valve for the control of fluids, having at least one annular seating ring co-operating with an obturating member the seating ring being sealed to the valve casing by an annular diaphragm of metal thin enough to be flexible, which is sealed at its inner margin to the seating ring and at its outer margin to the valve casing so that the obturating member is allowed limited float, the diaphragm and the valve casing being of such section that when the valve is assembled the diaphragm is elastically deflected sufficiently to exert spring pressure of the ring against the obturating member while leaving a gap between the back of the diaphragm and the valve casing so that the controlled medium has access to the back of the diaphragm, in which the seal between the seating ring and the diaphragm is made by an O-ring and the seal between the diaphragm and casing is made by an O-ring.

2. A valve according to claim 1 in which the diaphragm at its inner margin terminates through a well-rounded junction in a tubular part which fits within and so carries the seating ring and the O-ring making the seal is lodged between the rounded junction and the seating ring so that it is protected from the controlled medium, while the cross-section of the diaphragm and seating ring in this region are such that the O-ring is wholly enclosed.

3. A valve according to claim 2 in which the enclosure of the O-ring is formed by the rounded junction and a recess in the back of the seating ring.

4. A valve according to claim 1 in which a guiding surface is provided in the valve casing in which the seating ring is a sliding fit.

5. A valve according to claim 4 in which the guiding surface and the guided surface of the seating ring are shouldered to limit movement of the seating ring towards the obturating member, but the shoulders are so located that when the seating ring is pressing all round against the obturating member the shoulders are not quite in contact.

6. A valve according to claim 1 in which a surface is provided in the valve casing so located and shaped that it takes part of the fluid pressure acting on the diaphragm.

7. A valve according to claim 4 in which a guiding surface and on which the seating ring is a sliding fit and a surface which takes part of the fluid pressure acting on the diaphragm are formed on a metal ring which fills a radial space between the seating ring and the valve casing.

8. A valve according to claim 1 in which at the outer margin the diaphragm has a part which is tubular and directed toward the obturating member, this tubular part lodging in a recess in the casing of the valve externally surrounding this tubular part, while an end fitting secured to the casing closes the recess, the O-ring being located in the recess so that the O-ring is substantially totally enclosed and is protected from the medium flowing through the valve as well as being located away from the parts directly swept by the medium.

9. A valve according to claim 8 in which the tubular part continues into an outward transverse part which is accommodated in the recess, the tubular part and outward transverse part lapping about half way round the cross-section of the O-ring.

10. A valve according to claim 1 in which the diaphragm has a corrugation near its outer margin to form a bead facing away from the obturating member, by the aid of which the initial deflection is applied when the valve is assembled while leaving clearance for the controlled medium to have access to the back of the diaphragm up to the bead.

11. A valve according to claim 1 in which the greater part of the diaphragm is flat when it is free.

12. A valve according to claim 10 in which the initial deflection of the diaphragm is applied through a flat surface on an end fitting secured to the valve casing.

13. A valve according to claim 1 in which the seating ring is of PTFE.

14. A valve according to claim 1 in which the diaphragm is of spring-hard stainless steel.

15. A valve according to claim 1 in which the O-rings are of plastics material based on a linear copolymer of vinylidene fluoride and hexafluoropropylene.

16. A valve according to claim 1 having an obturating member in the form of a ball plug.

References Cited

UNITED STATES PATENTS

| | | | |
|---|---|---|---|
| 1,489,857 | 4/1924 | Stevens | 251—174 |
| 2,048,884 | 7/1936 | Nordstrom | 251—172 X |
| 3,077,902 | 2/1963 | Vickery | 251—174 X |

FOREIGN PATENTS 978,601 12/1964 Great Britain.

CLARENCE R. GORDON, *Primary Examiner.*